United States Patent
Piao et al.

(10) Patent No.: US 12,406,998 B2
(45) Date of Patent: Sep. 2, 2025

(54) POSITIVE ELECTRODE SLURRY INCLUDING OXALIC ACID, PREPARATION METHOD THEREOF, POSITIVE ELECTRODE FOR SECONDARY BATTERY, AND SECONDARY BATTERY

(71) Applicant: LG CHEM, LTD., Seoul (KR)

(72) Inventors: Shanghao Piao, Daejeon (KR); Hye Lim Shim, Daejeon (KR); Wooha Kim, Daejeon (KR); Sang Hoon Choy, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 611 days.

(21) Appl. No.: 16/965,685

(22) PCT Filed: Dec. 4, 2019

(86) PCT No.: PCT/KR2019/017022
§ 371 (c)(1),
(2) Date: Jul. 29, 2020

(87) PCT Pub. No.: WO2020/138751
PCT Pub. Date: Jul. 2, 2020

(65) Prior Publication Data
US 2021/0043938 A1    Feb. 11, 2021

(30) Foreign Application Priority Data

Dec. 26, 2018 (KR) .................. 10-2018-0169827
Dec. 3, 2019 (KR) .................. 10-2019-0159241

(51) Int. Cl.
*H01M 4/62* (2006.01)
*H01M 4/02* (2006.01)
(Continued)

(52) U.S. Cl.
CPC ............ *H01M 4/628* (2013.01); *H01M 4/04* (2013.01); *H01M 4/131* (2013.01);
(Continued)

(58) Field of Classification Search
None
See application file for complete search history.

(56) References Cited

U.S. PATENT DOCUMENTS

| 5,932,632 A | 8/1999 | Biensan et al. |
| 6,019,802 A | 2/2000 | Ishizuka et al. |

(Continued)

FOREIGN PATENT DOCUMENTS

| CN | 104332595 A | 2/2015 |
| CN | 106104872 A | 11/2016 |

(Continued)

OTHER PUBLICATIONS

Machine translation of JP H04-328278 A (Year: 1992).*
(Continued)

*Primary Examiner* — Robert S Carrico
(74) *Attorney, Agent, or Firm* — Morgan, Lewis & Bockius LLP

(57) ABSTRACT

Provided is a positive electrode slurry for preparing a positive electrode for a lithium secondary battery,
the positive electrode slurry including a positive electrode active material, a conductive material, a binder, overcharge inhibitor, oxalic acid, and a solvent,
wherein the overcharge inhibitor is included in an amount of 1 part by weight to 2 parts by weight, based on 100 parts by weight of the total solid content of the positive electrode active material, the conductive material, and the binder of the positive electrode slurry,
the oxalic acid is included in an amount of 0.1 part by weight to 0.7 parts by weight, based on 100 parts by (Continued)

weight of the total solid content of the positive electrode active material, the conductive material, and the binder of the positive electrode slurry, and the positive electrode slurry has a viscosity of 4000 cp to 15000 cp at room temperature.

15 Claims, 2 Drawing Sheets

(51) Int. Cl.
  *H01M 4/04* (2006.01)
  *H01M 4/131* (2010.01)
  *H01M 4/1391* (2010.01)
  *H01M 4/36* (2006.01)
  *H01M 4/505* (2010.01)
  *H01M 4/525* (2010.01)
  *H01M 10/0525* (2010.01)
  *H01M 10/42* (2006.01)

(52) U.S. Cl.
  CPC ......... *H01M 4/1391* (2013.01); *H01M 4/362* (2013.01); *H01M 4/505* (2013.01); *H01M 4/525* (2013.01); *H01M 10/0525* (2013.01); *H01M 10/4235* (2013.01); *H01M 2004/028* (2013.01)

(56) References Cited

U.S. PATENT DOCUMENTS

| | | |
|---|---|---|
| 10,026,955 B2 | 7/2018 | Shindo |
| 2012/0082883 A1 | 4/2012 | Yamaguchi et al. |
| 2012/0231341 A1 | 9/2012 | Kim et al. |
| 2014/0255796 A1* | 9/2014 | Matsuoka ............ H01M 4/139 429/188 |
| 2015/0107093 A1 | 4/2015 | Luo et al. |
| 2017/0104206 A1 | 4/2017 | Tanaka et al. |
| 2018/0261832 A1* | 9/2018 | Nho ...................... H01M 4/628 |
| 2019/0051891 A1* | 2/2019 | Matsuu ................. H01M 4/364 |

FOREIGN PATENT DOCUMENTS

| | | | |
|---|---|---|---|
| CN | 106384816 A | 2/2017 | |
| CN | 106571468 A | 4/2017 | |
| CN | 108701813 A | 10/2018 | |
| EP | 2437334 A1 | 4/2012 | |
| JP | 04328278 A * | 11/1992 | .......... H01M 10/052 |
| JP | H10-074521 A | 3/1998 | |
| JP | 2009-277397 A | 11/2009 | |
| JP | 2010-277756 A | 12/2010 | |
| KR | 1020060098789 A | 9/2006 | |
| KR | 10-2007-0082931 A | 8/2007 | |
| KR | 10-2009-0039496 A | 4/2009 | |
| KR | 10-0950038 B1 | 3/2010 | |
| KR | 10-2012-0104484 A | 9/2012 | |
| KR | 10-2016-0014461 A | 2/2016 | |
| KR | 10-2016-0026762 A | 3/2016 | |
| KR | 10-2016-0087657 A | 7/2016 | |
| WO | 1996/013873 A1 | 5/1996 | |
| WO | 2017/158961 A1 | 9/2017 | |

OTHER PUBLICATIONS

Extended European Search Report issued in European Patent Application No. 19906166.4 dated Aug. 23, 2021.
International Search Report (with partial translation) and Written Opinion issued in corresponding International Patent Application No. PCT/KR2019/017022, dated Mar. 25, 2020.

* cited by examiner

POSITIVE ELECTRODE SLURRY INCLUDING OXALIC ACID, PREPARATION METHOD THEREOF, POSITIVE ELECTRODE FOR SECONDARY BATTERY, AND SECONDARY BATTERY

CROSS-REFERENCE TO RELATED APPLICATION

The present application is based on, and claims priority from, Korean Patent Application Nos. 10-2018-0169827 and 10-2019-0159241, filed on Dec. 26, 2018 and Dec. 3, 2019, respectively, the disclosures of which are hereby incorporated by reference herein in their entirety.

TECHNICAL FIELD

The present invention relates to a positive electrode slurry including oxalic acid, a preparation method thereof, a positive electrode for a secondary battery, and a secondary battery.

BACKGROUND ART

A rapid increase in the use of fossil fuels has led to an increase in the demand for the use of alternative energy or clean energy. As a part of such demand, most actively investigated fields are power generation/storage applications based on electrochemistry.

At present, a representative example of electrochemical devices using the foregoing electrochemical energy may be a secondary battery, and the application range thereof continues to expand.

In recent years, increased technological development and demand for mobile equipment such as a portable computer, a mobile phone, a camera, etc. have led to a rapid increase in the demand for secondary batteries as an energy source. Among these secondary batteries, lithium secondary batteries having high energy density and operational voltage, long cycle life and low self-discharge ratio are extensively studied, commercially available and widely used.

In addition, increased concern over environmental issues has brought about a great deal of research associated with electric vehicles and hybrid electric vehicles as substitutes for vehicles using fossil fuels, such as gasoline vehicles and diesel vehicles, which are a major cause of air pollution. Although nickel metal hydride secondary batteries have generally been used as a power source of such electric vehicles, hybrid electric vehicles, etc., a great deal of studies into use of lithium secondary batteries having high energy density and high discharge voltage are underway and some of these are commercially available.

As a negative electrode active material for the lithium secondary batteries, carbon materials are mainly used. As a positive electrode active material for the lithium secondary batteries, lithium transition metal complex oxides are used. Among them, lithium cobalt complex metal oxide having a high working voltage and excellent capacity characteristics, such as $LiCoO_2$, etc. has been frequently used. However, $LiCoO_2$ has very poor thermal properties due to destabilization of the crystal structure according to desorption of lithium ions. Further, since $LiCoO_2$ is expensive, there is a limitation in mass-use thereof as a power source in the fields such as electric vehicles.

As substitutes therefor, various lithium transition metal oxides, such as $LiNiO_2$, $LiMnO_2$, $LiMn_2O_4$ or $LiFePO_4$, etc., have been developed as positive electrode active materials.

Among them, $LiNiO_2$ has an advantage of exhibiting a battery characteristic of a high discharge capacity, and the most popular material is lithium nickel manganese cobalt oxide, $Li(Ni_aCo_bMn_c)O_2$ (wherein a, b, and c each represent atomic fractions of independent oxide composition elements, and satisfy $0<a<1$, $0<b<1$, $0<c<1$, $a+b+c=1$) by partial substitution with Co and Mn in the nickel oxide.

Among the lithium nickel manganese cobalt oxides, nickel-rich positive electrode materials having a high nickel content of 80 mol % or more are used in small-sized batteries.

However, the nickel-rich lithium transition metal oxide has a problem of reduced phase stability of slurry, as compared with a Co-based positive electrode material, $LiCoO_2$. Therefore, there are many difficulties in slurry mixing conditions or slurry management.

In the future, application of the nickel-rich lithium transition metal oxide as the positive electrode active material is expected to expand to medium- to large-sized battery models, such as vehicles, etc., as well as small-sized batteries, and thus there is a demand for a technology to effectively manage changes of slurry over time.

DISCLOSURE

Technical Problem

The present invention has been made to solve the above-mentioned problems of the prior art and the technical problems that have been requested from the past.

An object of the present invention is to provide a positive electrode slurry which includes oxalic acid to effectively control viscosity of the slurry and to resolve agglomeration, thereby ensuring processability.

Further, another object of the present invention is to provide a method of preparing the positive electrode slurry, in which stability of the slurry is ensured by controlling a feeding amount, a feeding temperature, and a feeding time of oxalic acid.

Furthermore, still another object of the present invention is to provide the positive electrode, of which surface defects are improved by using the positive electrode slurry, and a secondary battery including the same.

Technical Solution

To achieve the above object,
one embodiment of the present invention provides a
  positive electrode slurry for preparing a positive electrode for a lithium secondary battery,
the positive electrode slurry including a positive electrode active material, a conductive material, a binder, an overcharge inhibitor, oxalic acid, and a solvent,
wherein the overcharge inhibitor is included in an amount of 1 part by weight to 2 parts by weight, based on 100 parts by weight of the total solid content of the positive electrode active material, the conductive material, and the binder of the positive electrode slurry,
the oxalic acid is included in an amount of 0.1 part by weight to 0.7 parts by weight, based on 100 parts by weight of the total solid content of the positive electrode active material, the conductive material, and the binder of the positive electrode slurry, and
the positive electrode slurry has a viscosity of 4000 cp to 15000 cp at room temperature.

Further, another embodiment of the preset invention provides a method of preparing the positive electrode slurry, the method including:
(a) a process of adding the positive electrode active material, the conductive material, and the binder to the solvent and then mixing them with each other to prepare a mixture; and
(b) a process of adding the oxalic acid and the overcharge inhibitor to the mixture and then mixing them with each other to prepare the positive electrode slurry; wherein the overcharge inhibitor is added in an amount of 1 part by weight to 2 parts by weight, based on 100 parts by weight of the total solid content of the positive electrode active material, the conductive material, and the binder of the positive electrode slurry, and the oxalic acid is added in an amount of 0.1 part by weight to 0.7 parts by weight, based on 100 parts by weight of the total solid content of the positive electrode active material, the conductive material, and the binder of the positive electrode slurry.

Furthermore, still another embodiment of the preset invention provides a positive electrode for a lithium secondary battery,
wherein a positive electrode mixture is formed on a positive electrode current collector,
the positive electrode mixture includes the positive electrode active material, the conductive material, the binder, and the overcharge inhibitor,
the overcharge inhibitor is added in an amount of 1 part by weight to 2 parts by weight, based on 100 parts by weight of the total solid content of the positive electrode active material, the conductive material, and the binder of the positive electrode mixture, and
the positive electrode may have 10 or less of grains which are formed by agglomeration of the solid components of the positive electrode mixture in the area of the surface 1 m of the positive electrode mixture x the coating width (w) thereof.

Furthermore, still another embodiment of the preset invention provides a secondary battery, in which an electrode assembly having a structure of the positive electrode, a negative electrode, and a separator interposed between the positive electrode and the negative electrode is impregnated with an electrolyte liquid.

BEST MODE FOR CARRYING OUT THE INVENTION

Figure 1:
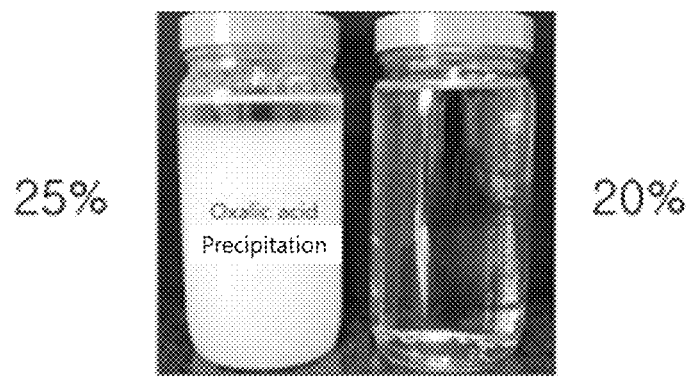
FIG. 1 shows the result of a dissolution test of oxalic acid at each concentration according to Experimental Example 1.

Hereinafter, the present invention will be described in more detail for better understanding of the present invention.

It will be understood that terms or words used in the specification and claims shall not be interpreted as the meaning defined in commonly used dictionaries, and the terms or words should be interpreted as having a meaning that is consistent with the technical idea of the invention, based on the principle that an inventor may properly define the meaning of the terms or words to best explain the invention.

Further, the terms used in this description are just for explaining exemplary embodiments and it is not intended to restrict the present invention. The singular expression may include the plural expression unless it is differently expressed contextually.

It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof beforehand.

One embodiment of the present invention provides a positive electrode slurry for preparing a positive electrode for a lithium secondary battery,
the positive electrode slurry including a positive electrode active material, a conductive material, a binder, an overcharge inhibitor, oxalic acid, and a solvent,
wherein the overcharge inhibitor is included in an amount of 1 part by weight to 2 parts by weight, based on 100 parts by weight of the total solid content of the positive electrode active material, the conductive material, and the binder of the positive electrode slurry,
the oxalic acid is included in an amount of 0.1 part by weight to 0.7 parts by weight, based on 100 parts by weight of the total solid content of the positive electrode active material, the conductive material, and the binder of the positive electrode slurry, and
the positive electrode slurry has a viscosity of 4000 cp to 15000 cp at room temperature.

Here, the positive electrode slurry, which is a positive electrode active material, may include one or more kinds of nickel-rich lithium nickel-based oxides, and particularly, one or more kinds of lithium nickel-based oxides represented by the following Chemical Formula 1:

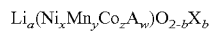

$$Li_a(Ni_xMn_yCo_zA_w)O_{2-b}X_b \qquad \text{[Chemical Formula 1]}$$

in Chemical Formula 1,
A is one or more elements selected from the group consisting of W, V, Cr, Nb, Mo, Fe, and Al,
X is one or more elements selected from the group consisting of P, N, F, S and Cl,
$0.95 \leq a \leq 1.2$, $0 \leq b \leq 0.02$, $0.6 \leq x \leq 1$, $0 \leq y \leq 0.4$, $0 \leq z \leq 0.4$, $0 \leq w \leq 0.2$, and $x+y+z+w=1$.

In other words, any one kind of lithium nickel-based oxide may be included, as long as it is represented by Chemical Formula 1, but a mixture of two or more thereof may be included.

More particularly, the content of Ni (x) may satisfy $0.8 \leq x \leq 1$, and one or more kinds of lithium nickel-based oxides represented by such a chemical formula may be included. For example, a mixture of one kind of lithium nickel-based oxide having the content of Ni (x) satisfying $0.8 \leq x \leq 1$ and a material such as $LiNiO_2$ having the content of Ni (x) satisfying x=1 may be included. When two kinds of lithium nickel-based oxides are mixed, a mixing ratio thereof may 1:9 to 9:1, specifically 8:2 to 7:3.

Further, the positive electrode slurry of the present invention may include an overcharge inhibitor, in terms of securing safety by solving problems such as heat generation, explosion, etc. of a secondary battery, when overcharge occurs during operation of a secondary battery.

In this regard, the overcharge inhibitor is preferably a substance that generates a gas such as $CO_2$ during overcharging to inflate a secondary battery, thereby inducing a short circuit between electrodes, while causing no side reactions with an electrolyte liquid even when it is included in the positive electrode slurry. For example, the overcharge inhibitor may be $Li_2CO_3$.

The overcharge inhibitor is included in an amount of 1 part by weight to 2 parts by weight, particularly, 1.2 parts by weight or more and 1.8 parts by weight or less, based on 100 parts by weight of the total solid content of the positive electrode active material, the conductive material, and the binder of the positive electrode slurry.

When the overcharge inhibitor is included in an amount smaller than the above range, sufficient gas generation does not occur during overcharging, and thus it is difficult to ensure battery safety. When the overcharge inhibitor is included in an amount larger than the above range, the content of the active material, which substantially contributes to the capacity, output characteristics, etc., becomes relatively small, which is not preferred.

Further, since the overcharge inhibitor also significantly influences viscosity of the slurry, the overcharge inhibitor is preferably included in the above range in consideration of various aspects such as battery stability, slurry viscosity, capacity, and the like.

Meanwhile, in terms of processability such as the easy application onto an electrode current collector, etc., while ensuring stability by preventing agglomeration of the positive electrode slurry, it is preferable that the positive electrode slurry has a viscosity in the above range.

Particularly, the viscosity may be 5000 cp or more and 15000 cp or less at room temperature.

Here, the room temperature means about 25° C., and includes an error range of +/−1° C.~2° C.

The viscosity may be measured using a type B viscometer (BROOKFIELD AMETEK, DV2T EXTRA Touch screen viscometer), and specifically, measured by immersing the spindle of the viscometer in the positive electrode slurry for 3 minutes at 12 RPM.

However, since the positive electrode slurry containing the Ni-rich positive electrode active material basically does not meet the above range, and generally has a slurry viscosity of 1000 cp or less at room temperature, there is a problem in that agglomeration occurs.

Accordingly, the inventors of the present application have conducted intensive studies, and as a result, they found a proper amount of oxalic acid for the most appropriate viscosity of the slurry by considering the solid components that influence the viscosity of the slurry, in particular, considering addition of the overcharge inhibitor that significantly influences the viscosity, leading to ensuring phase stability of the slurry.

Here, the overcharge inhibitor has different viscosity tendencies depending on the slurry temperature at the time of adding oxalic acid. Specifically, when the slurry temperature at the time of adding oxalic acid is similar to room temperature (about 25° C.), the viscosity increases with the addition of oxalic acid. When the slurry temperature is as relatively high as 60° C. or more, the overcharge inhibitor causes the adverse effect of suppressing the viscosity increase of slurry when oxalic acid is added.

In this regard, the positive electrode slurry is prepared by adding the positive electrode active material, the conductive material, the binder, the overcharge inhibitor, and oxalic acid to the solvent and then mixing them with each other, in which the temperature of the slurry gradually increases during mixing. At this time, to decrease the temperature of the slurry, a continuous cooling process is conducted. However, in the mass production of the positive electrode slurry, there is a limitation in setting the temperature of the slurry at a low temperature. For this reason, the temperature immediately after mixing the positive electrode slurry may be 45° C. to 60° C.

Thus, the inventors of the present application, in consideration of all the effects of the overcharge inhibitor when the temperature of the slurry is 45° C. to 60° C., found the content of oxalic acid to meet the above range of viscosity even in all cases. Specifically, the content of oxalic acid may be 0.1 part by weight to 0.7 parts by weight, specifically, 0.1 part by weight to 0.6 parts by weight, and more specifically, 0.15 parts by weight or more and 0.5 parts by weight or less, based on 100 parts by weight of the total solid content of the positive electrode active material, the conductive material, and the binder of the positive electrode slurry.

When oxalic acid is included in an excessively small amount out of the above range, addition of oxalic acid hardly affect the viscosity change, and thus there is a problem in that it is difficult to verify reproducibility. When oxalic acid is included in an excessively large amount out of the above range, the viscosity excessively increases, and application of the slurry onto the electrode current collector is difficult, which is not preferable in view of ease of process.

When meeting the above conditions, the positive electrode slurry may have appropriate viscosity to prevent reduction of phase stability of the slurry, and thus it is possible to ensure excellent processability.

Meanwhile, the positive electrode slurry may further include, in addition to the lithium nickel-based oxide represented by Chemical Formula 1, layered compounds such as lithium cobalt oxide ($LiCoO_2$), lithium nickel oxide ($LiNiO_2$), etc., or their compounds substituted by one or more transition metals; lithium manganese oxides such as compounds represented by $Li_{1+x}Mn_{2-x}O_4$ (wherein x is 0~0.33), $LiMnO_3$, $LiMn_2O_3$, $LiMnO_2$, etc.; lithium copper oxide ($Li_2CuO_2$); vanadium oxides such as $LiV3O_8$, $LiFe_3O_4$, $V_2O_5$, $Cu_2V_2O_7$, etc.; lithium manganese composite oxides represented by Chemical Formula $LiMn_{2-x}M_xO_2$ (wherein M=Co, Ni, Fe, Cr, Zn, or Ta, and x=0.01~0.1), or $Li_2Mn_3MO_8$ (wherein M=Fe, Co, Ni, Cu, or Zn); $LiMn_2O_4$ wherein Li is partially substituted by alkaline earth metal ions; disulfide compounds; $Fe_2(MoO_4)_3$; lithium metal phosphate compounds represented by Chemical Formula $LiFe_xMn_yCo_zPO_4$ (wherein x, y, z≥0, x+y+z=1), etc. In this regard, the lithium nickel-based oxide represented by Chemical Formula 1 may be included in an amount of 60% by weight or more with respect to the total weight of the active material.

Further, the slurry may include the conductive material and the binder.

The conductive material may be commonly added in an amount of 1% by weight to 30% by weight, specifically, 1% by weight to 10% by weight, and more specifically 1% by weight to 5% by weight, based on the total solid content including the positive electrode active material. The conductive material is not particularly limited, as long as it has conductivity without causing chemical changes in a battery. Examples thereof may include graphite such as natural graphite, artificial graphite, etc.; carbon black such as carbon black, acetylene black, Ketjen black, channel black, furnace black, lamp black, and thermal black, etc.; conductive fibers such as carbon fibers, metallic fibers, etc.; metallic powders such as carbon fluoride powder, aluminum powder, and nickel powder; conductive whiskers such as zinc oxide, potassium titanate, etc.; conductive metal oxides such as titanium oxide, etc.; conductive materials such as polyphenylene derivatives, etc.

The binder is a component assisting the binding between the active material and the conductive material and the binding of the active material to the current collector. The binder is commonly added in an amount of 1% by weight to 30% by weight, specifically 1% by weight to 10% by weight, and more specifically 1% by weight to 5% by weight, based on the total solid content including the positive electrode active material. Examples of the binder may include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymers (EPDM), sulfonated EPDM, styrene butadiene rubber, fluororubber, various copolymers, etc.

In addition to the above materials, a filler may be further included, and it may be added in an amount of 0.1% by weight to 3% by weight, based on the total solid content including the positive electrode active material. The filler is a component to suppress expansion of the positive electrode, and optionally used. The filler is not particularly limited, as long as it is a fibrous material without causing chemical changes in a battery. Examples of the filler may include olefin polymers such as polyethylene, polypropylene, etc.; and fibrous materials such as glass fibers, carbon fibers, etc.

Meanwhile, as a solvent for mixing these solid components, an organic solvent or an aqueous solvent may be generally used. For example, the organic solvent may include N-methyl-2-pyrrolidone (NMP), methoxypropyl acetate, butyl acetate, glycol acid, butyl ester, butyl glycol, methylalkyl polysiloxane, alkyl benzene, propylene glycol, xylene, monophenyl glycol, aralkyl-modified methylalkyl polysiloxane, polyether-modified dimethylpolysiloxane copolymer, polyether-modified dimethylpolysiloxane copolymer, a polyacrylate solution, alkylbenzene, diisobutyl ketone, organically modified polysiloxane, butanol, isobutanol, modified polyacrylate, modified polyurethane, and polysiloxane-modified polymer, which may be preferably used alone or in a mixture of two or more thereof.

Further, as the aqueous solvent, water may be used.

Another embodiment of the preset invention provides a method of preparing the positive electrode slurry, the method including:

(a) a process of adding the positive electrode active material, the conductive material, and the binder to the solvent and then mixing them with each other to prepare a mixture; and (b) a process of adding the oxalic acid and the overcharge inhibitor to the mixture and then mixing them with each other to prepare the positive electrode slurry; wherein the overcharge inhibitor is added in an amount of 1 part by weight to 2 parts by weight, based on 100 parts by weight of the total solid content of the positive electrode active material, the conductive material, and the binder of the positive electrode slurry, and the oxalic acid is added in an amount of 0.1 part by weight to 0.7 parts by weight, based on 100 parts by weight of the total solid content of the positive electrode active material, the conductive material, and the binder of the positive electrode slurry.

Here, descriptions of the positive electrode active material, the conductive material, the binder, the solvent, and the overcharge inhibitor are the same as described above.

In this regard, the conductive material and the binder may be added in a solution state, in which a solvent for the solution of the conductive material and the binder may be an organic solvent or an aqueous solvent. The same solvent as used in the preparation of the slurry may be used.

Further, the oxalic acid may also be added in a solution state, in which oxalic acid is dissolved in a solvent, for uniform and easy injection during the mixing process. If the oxalic acid is added in a solid phase of oxalic acid powder, it may not be uniformly added, which may cause local heat generation in the slurry. As a result, gelation may occur, which is not preferred.

In this regard, the concentration of the oxalic acid solution may be 10% to 20%. In other words, the oxalic acid solution in which 10 g to 20 g of oxalic acid powder is included in 100 g of the oxalic acid solution may be used.

If the concentration is excessively low out of the above range, there is a problem in that too much oxalic acid solution should be used in order to add the appropriate amount of oxalic acid. If the concentration exceeds 20%, oxalic acid is not completely dissolved but precipitated, and undesirably, it is useless to add the oxalic acid in the solution state.

As described, in the case of using the oxalic acid solution, the oxalic acid solution may be added such that the content of oxalic acid is 0.1 part by weight to 0.7 parts by weight.

Meanwhile, the mixing of the positive electrode active material, the conductive material, and the binder may be performed by a mixing method using a BTM mixer (INOUE Inc., 5 L volume, a triaxial mixer having a total of three blades including one low speed blade and two high speed blades). At this time, the mixing may be performed with Blade (low speed blade) of 20 rpm to 30 rpm and Homodisper (high speed blade) of 2000 rpm to 2500 rpm for 60 min to 80 min.

Further, the mixing after adding the oxalic acid and the overcharge inhibitor may be performed by a mixing method using a Homogenizing disper mixer (PRIMIX Corp., 500 ml volume, one high speed disper). At this time, the mixing may be performed at 2500 rpm to 3000 rpm for 5 min to 20 min.

As described above, the temperature of the positive electrode slurry gradually increases when the solid components are mixed, and the temperature of the mixture after performing the process (a) may be 45° C. to 70° C., and therefore, the process (b) may be performed when the temperature of the mixture of the process (a) is 45° C. to 70° C.

Within the above range, when the slurry is prepared by the method according to the present invention, the viscosity of the slurry is 4000 cp to 15000 cp at room temperature, indicating that the slurry may have the desired viscosity.

Further, the inventors of the present application have conducted intensive studies, and as a result, they found that the viscosity of the slurry changes depending on the addition order of the oxalic acid and the overcharge inhibitor, in addition to controlling the content of oxalic acid within the above range.

Specifically, as described above, the overcharge inhibitor was found to be a material that influences the viscosity decrease at a high temperature of the slurry. The changes in the slurry viscosity were observed when the reaction time with the oxalic acid is changed by changing the addition order of the overcharge inhibitor. Practically, in the existing mixing recipe, oxalic acid was added in the last mixing step. In this case, its thickening effect on the slurry was poor. Thus, to minimize the reaction of the overcharge inhibitor with oxalic acid which inhibits thickening, the slurry was prepared by a mixing method of first adding oxalic acid and then adding the overcharge inhibitor later, and slurry viscosity at a high temperature was compared.

As described, when the overcharge inhibitor is added later, viscosity increase of the slurry by addition of oxalic acid is increased, and as a result, the positive electrode slurry prepared by pre-adding the overcharge inhibitor has lower viscosity than the positive electrode slurry prepared by post-adding the overcharge inhibitor, when the equal amounts of the overcharge inhibitor and the oxalic acid are added.

Meanwhile, as described above, the viscosity of the positive electrode slurry may be specifically 5000 cp or more and 15000 cp or less at room temperature, even when the addition time is considered. The viscosity is most preferably 7000 cp to 15000 cp, even when phase stability of the slurry and processability are considered.

To meet the above range of viscosity, the viscosity increase is required to be in a predetermined level or more in the slurry including Ni-rich lithium nickel-based oxide as the positive electrode active material, and therefore, the process (b) is more preferably performed by the order of pre-adding oxalic acid and post-adding the overcharge inhibitor.

In this regard, the addition time of the overcharge inhibitor is not limited, but it may be added within 5 minutes after addition of oxalic acid, specifically, in 1-second to 5-minute intervals.

If the interval is too short out of the above range, the effect of increasing viscosity by controlling the order of adding the overcharge inhibitor becomes useless, because the overcharge inhibitor is added even before oxalic acid completely exerts the effect of increasing the viscosity. If the interval is too long, the overall process time becomes long, which is not efficient.

As described, according to the present invention, optimal results in terms of phase stability of the slurry and processability may be obtained by controlling the amount of oxalic acid and the addition order and even by considering the temperature of slurry at the time of adding the oxalic acid and the overcharge inhibitor.

Meanwhile, a positive electrode may be fabricated by using the positive electrode slurry prepared as above, and specifically, the positive electrode may be fabricated by applying the positive electrode slurry onto a positive electrode current collector, followed by drying and rolling.

Therefore, still another embodiment of the present invention provides a positive electrode,
wherein a positive electrode mixture is formed on a positive electrode current collector,
the positive electrode mixture includes the positive electrode active material, the conductive material, the binder, and the overcharge inhibitor,
the overcharge inhibitor is added in an amount of 1 part by weight to 2 parts by weight, based on 100 parts by weight of the total solid content of the positive electrode active material, the conductive material, and the binder of the positive electrode mixture, and
the positive electrode has 10 or less of grains which are formed by agglomeration of the solid components of the positive electrode mixture in the area of the surface 1 m of the positive electrode mixture x the coating width (w) thereof.

Here, the coating width (w) is the length in the direction perpendicular to the direction of application of the positive electrode slurry, specifically 0.2 m to 0.4 m.

Specifically, the grain may be 5 or less, and more specifically 3 or less.

According to the present invention, the slurry viscosity may be optimized, and the slurry stability may be ensured, and therefore, when the slurry is coated on the positive electrode current collector, re-agglomeration of the solid components may be alleviated, thereby improving the surface defects.

Other descriptions of the positive electrode active material, the conductive material, the binder, the overcharge inhibitor, etc. defined in the positive electrode are the same as described above.

Furthermore, still another embodiment of the present invention provides a secondary battery, in which an electrode assembly having a structure of the positive electrode, a negative electrode, and a separator interposed between the positive electrode and the negative electrode is impregnated with an electrolyte liquid.

In this regard, the secondary battery may be a lithium secondary battery.

A method of manufacturing the secondary battery is widely known in the art, and description thereof will be omitted herein.

Hereinafter, examples of the present invention will be described in detail so that those skilled in the art may easily carry out the present invention. The present invention may, however, be embodied in many different forms and is not limited to the examples set forth herein.

Experimental Example 1

A dissolution test was carried out while oxalic acid was dissolved in NMP (N-Methyl Pyrrolidone) by varying the concentration of oxalic acid (weight of oxalic acid/weight of solution×100) at 20% and 25%, and illustrated in FIG. 1.

Referring to FIG. 1, complete dissolution was observed at the concentration of 20%, whereas oxalic acid at the concentration of 25% reached a saturation state, and was not further dissolved, leading to precipitation.

In the present invention, therefore, the oxalic acid solution at the concentration of 20% was used.

Experimental Example 2

96.865% by weight of active materials including an active material of $LiNi_{0.8}Mn_{0.1}Co_{0.1}O_2$ and an active material of $LiNiO_2$ at a weight ratio of 80:20, 1.9% by weight of carbon black in a pre-dispersion solution (16% solution of carbon black in NMP) as a conductive material, and 1.235% by weight of PVDF in a PVDF solution (6% solution of PVDF in NMP) as a binder were added and mixed using a BTM mixer (INOUE Inc., 5 L volume, a triaxial mixer having a total of three blades including one low speed blade and two high speed blades).

The mixtures at 25° C. and 60° C. were prepared as samples, respectively.

The oxalic acid solution (20% concentration) of Experimental Example 1 was mixed with each of the two mixtures using a Homogenizing disper mixer (PRIMIX Corp., 500 ml volume, one high speed disper) such that the amount of oxalic acid was 0.5 parts by weight, based on the total weight of the active material, the conductive material, and the binder, and thereafter, 3 parts by weight (excess) of $Li_2CO_3$ was mixed therewith using a Homogenizing disper mixer (PRIMIX Corp., 500 ml volume, one high speed disper). Changes in the viscosity by addition of $Li_2CO_3$ were examined, and the results are shown in Table 1.

TABLE 1

| slurry composition | Viscosity (cp) | |
|---|---|---|
| | Mixture temperature of 25° C. | Mixture temperature of 60° C. |
| $LiNi_{0.8}Mn_{0.1}Co_{0.1}O_2$ + $LiNiO_2$ + carbon black + PVDF + oxalic acid | 2800 | 100000 |
| $LiNi_{0.8}Mn_{0.1}Co_{0.1}O_2$ + $LiNiO_2$ + carbon black + PVDF + oxalic acid + $Li_2CO_3$ | 3050 | 17800 |
| $Li_2CO_3$ effect | 350 increase | 82200 decrease |

*viscosity may be measured using a B-type viscometer (BROOKFIELD AMETEK, DV2T EXTRA Touch screen viscometer), specifically, measured by immersing the spindle of the viscometer in the positive electrode slurry for 3 minutes at 12 RPM.

Referring to Table 1, the addition of $Li_2CO_3$ did not greatly influence the viscosity increase when the mixture temperature was 25° C., but caused the viscosity decrease when the mixture temperature was 60° C. The degree of the viscosity decrease was very large. These experimental results suggest that the viscosity decrease of the high temperature slurry may be influenced by $Li_2CO_3$.

Referring to these results, the degree of the viscosity increase is changed when the reaction time with oxalic acid is changed by changing the addition order of $Li_2CO_3$, and therefore, in order to obtain a desired viscosity, the addition order of $Li_2CO_3$ and oxalic acid, and the content of oxalic acid may be determined.

Reference 96.865% by weight of active materials including an active material of $LiNi_{0.8}Mn_{0.1}Co_{0.1}O_2$ and an active material of $LiNiO_2$ at a weight ratio of 80:20, 1.9% by weight of carbon black in a pre-dispersion solution (16% solution of carbon black in NMP) as a conductive material, and 1.235% by weight of PVDF in a PVDF solution (6% solution of PVDF in NMP) as a binder were added and mixed using a BTM mixer (INOUE Inc., 5 L volume, a triaxial mixer having a total of three blades including one low speed blade and two high speed blades). The mixture was maintained at 25° C.

2 parts by weight of $Li_2CO_3$, based on the total 100 parts by weight of the solid contents of the mixture, was mixed (Homogenizing disper mixer (PRIMIX Corp., 500 ml volume, one high speed disper)), thereby preparing a slurry.

Comparative Example 1

96.865% by weight of active materials including an active material of $LiNi_{0.8}Mn_{0.1}Co_{0.1}O_2$ and an active material of $LiNiO_2$ at a weight ratio of 80:20, 1.9% by weight of carbon black in a pre-dispersion solution (16% solution of carbon black in NMP) as a conductive material, and 1.235% by weight of PVDF in a PVDF solution (6% solution of PVDF in NMP) as a binder were added and mixed using a BTM mixer (INOUE Inc., 5 L volume, a triaxial mixer having a total of three blades including one low speed blade and two high speed blades). The mixture was maintained at 25° C.

2 parts by weight of $Li_2CO_3$, based on the total 100 parts by weight of the solid contents of the mixture, was mixed (Homogenizing disper mixer (PRIMIX Corp., 500 ml volume, one high speed disper)), and 5 minutes later, the oxalic acid solution (20% concentration) of Experimental Example 1 was mixed (Homogenizing disper mixer (PRIMIX Corp., 500 ml volume, one high speed disper)) such that the amount of oxalic acid was 0.05 parts by weight, thereby preparing a slurry.

Comparative Example 2

A slurry was prepared in the same manner as in Comparative Example 1, except that $Li_2CO_3$ and the oxalic acid solution were sequentially added while maintaining the temperature of the mixture at 60° C. in Comparative Example 1.

Comparative Example 3

A slurry was prepared in the same manner as in Comparative Example 1, except that the oxalic acid solution was first added, and 5 minutes later, $Li_2CO_3$ was added while maintaining the temperature of the mixture at 60° C. in Comparative Example 1.

Example 1

96.865% by weight of active materials including an active material of $LiNi_{0.8}Mn_{0.1}Co_{0.1}O_2$ and an active material of $LiNiO_2$ at a weight ratio of 80:20, 1.9% by weight of carbon black in a pre-dispersion solution (16% solution of carbon black in NMP) as a conductive material, and 1.235% by weight of PVDF in a PVDF solution (6% solution of PVDF in NMP) as a binder were added and mixed using a BTM mixer (INOUE Inc., 5 L volume, a triaxial mixer having a total of three blades including one low speed blade and two high speed blades). The mixture was maintained at 25° C.

2 parts by weight of $Li_2CO_3$, based on the total 100 parts by weight of the solid contents of the mixture, was mixed (Homogenizing disper mixer (PRIMIX Corp., 500 ml volume, one high speed disper)), and 5 minutes later, the oxalic acid solution (20% concentration) of Experimental Example 1 was mixed (Homogenizing disper mixer (PRIMIX Corp., 500 ml volume, one high speed disper)) such that the amount of oxalic acid was 0.15 parts by weight, thereby preparing a slurry.

Example 2

A slurry was prepared in the same manner as in Example 1, except that $Li_2CO_3$ and the oxalic acid solution were sequentially added while maintaining the temperature of the mixture at 60° C. in Example 1.

Example 3

A slurry was prepared in the same manner as in Example 1, except that the oxalic acid solution was first added, and 5 minutes later, $Li_2CO_3$ was added while maintaining the temperature of the mixture at 60° C. in Example 1.

Example 4

A slurry was prepared in the same manner as in Example 1, except that the oxalic acid solution was mixed such that the amount of oxalic acid was 0.5 parts by weight in Example 1.

Example 5

A slurry was prepared in the same manner as in Example 1, except that $Li_2CO_3$ and the oxalic acid solution were sequentially added, wherein the oxalic acid solution was mixed such that the amount of oxalic acid was 0.5 parts by weight, while maintaining the temperature of the mixture at 60° C. in Example 1.

Example 6

A slurry was prepared in the same manner as in Example 1, except that the oxalic acid solution was first added, and 5 minutes later, $Li_2CO_3$ was added, wherein the oxalic acid solution was mixed such that the amount of oxalic acid was 0.5 parts by weight, while maintaining the temperature of the mixture at 60° C. in Example 1.

Comparative Example 4

A slurry was prepared in the same manner as in Example 1, except that the oxalic acid solution was mixed such that the amount of oxalic acid was 0.5 parts by weight, without mixing with $Li_2CO_3$, while maintaining the temperature of the mixture at 60° C. in Example 1.

Experimental Example 3

Viscosities of the slurries of Examples 1 to 6 and Comparative Examples 1 to 4 were measured. Each viscosity was measured in the same manner as in Experimental Example 2, and the results are illustrated in FIG. 2.

Figure 2:
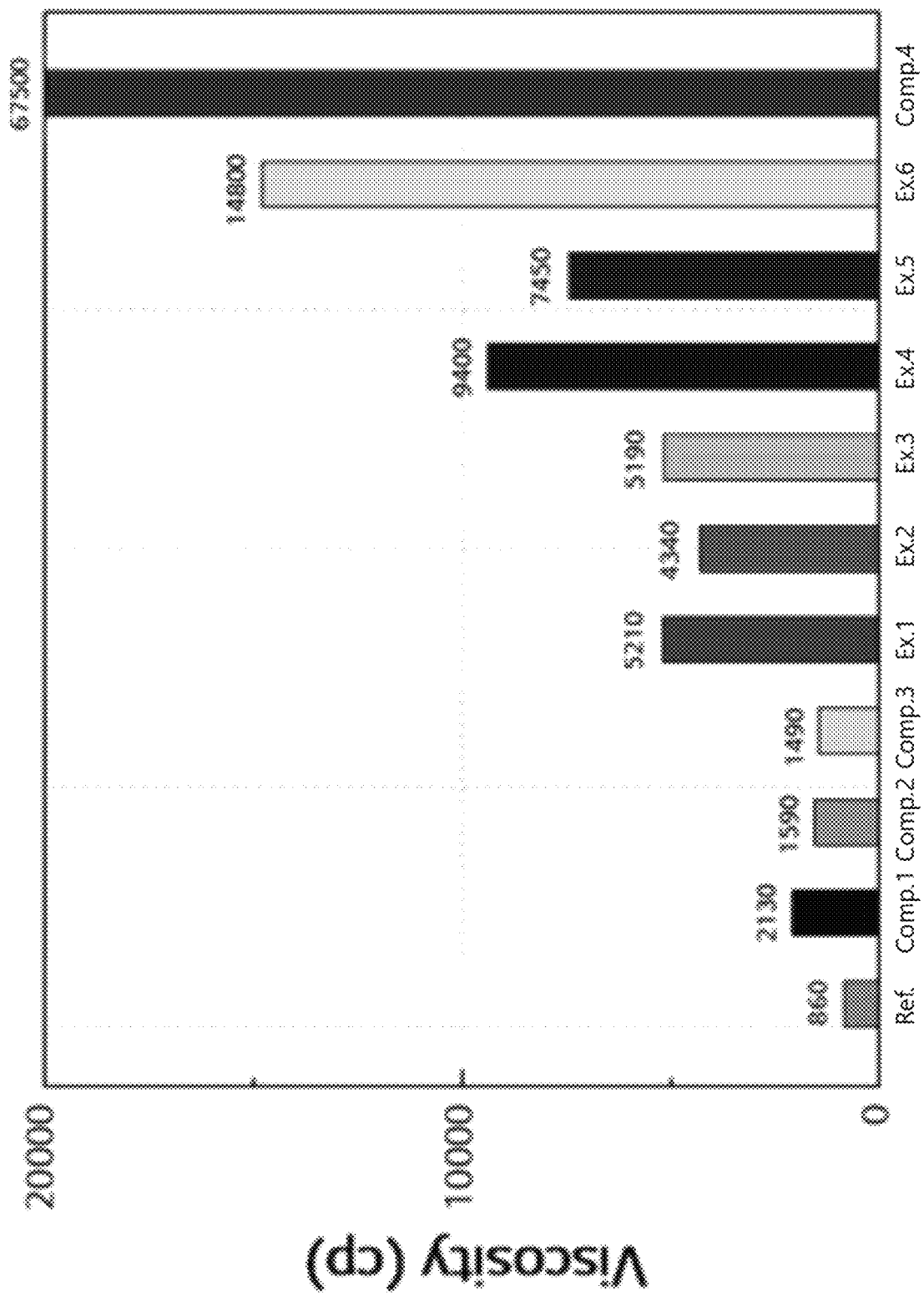
FIG. 2 is a graph showing slurry viscosity according to Experimental Example 3.

Referring to FIG. 2, there were no practical changes in the slurry viscosity values according to the addition time of oxalic acid (0.05 parts by weight, 0.15 parts by weight, or 0.5 parts by weight) or temperature, but the slurry viscosity tends to increase with the increasing amount of oxalic acid, as compared with the reference composition without oxalic acid.

Meanwhile, it was confirmed that when the content of oxalic acid was less than 0.1 part by weight (Comparative Examples 1 to 3), the desired slurry viscosity could not be obtained regardless of the addition time of oxalic acid, temperature, etc.

In contrast, when the content of oxalic acid meets the limited range of the present invention, the slurry thickening effect by addition of oxalic acid was observed at room temperature when the mixing recipe of pre-adding $Li_2CO_3$ was applied (Example 1), but the degree of slurry thickening was decreased at the high temperature due to the effect of decreasing high-temperature viscosity by $Li_2CO_3$ (Example 2). In the case of adding oxalic acid prior to $Li_2CO_3$ at the high temperature, the slurry viscosity was higher than vice versa (Example 3).

Meanwhile, when the content of oxalic acid was increased (0.5 parts by weight), the degree of viscosity increase was further increased, indicating that for efficient slurry thickening effect through addition of oxalic acid, optimization of the addition time was further required. In particular, it was confirmed that the influence of addition order of $Li_2CO_3$ on the viscosity was remarkable at the high temperature.

Specifically, when the content of oxalic acid was high (Examples 4 to 6), the slurry viscosity was decreased at the high temperature rather than at room temperature by pre-addition of $Li_2CO_3$, whereas the slurry viscosity was remarkably improved by adding oxalic acid prior to $Li_2CO_3$.

In conclusion, considering that the temperature increase due to mixing is naturally accompanied during mass-production of the positive electrode slurry, more preferable range of slurry viscosity may be obtained when the content of oxalic acid is 0.15 parts by weight or more and 0.5 parts by weight or less, and the oxalic acid is added prior to $Li_2CO_3$.

However, when only oxalic acid is added without $Li_2CO_3$, the viscosity is excessively increased, which is not preferable.

Accordingly, when the preparation method of the present invention is used, the appropriate slurry viscosity may be obtained, and thus it is expected to obtain an electrode having improved surface defects (i.e., remarkably reduced number of grains).

Those skilled in the art to which the present invention pertains will be able to make various applications and modifications within the scope of the present invention, based on the above contents.

INDUSTRIAL AVAILABILITY

As described above, in a positive electrode slurry and a preparation method thereof according to the present invention, since an appropriate amount of oxalic acid is used to control viscosity of the slurry, agglomeration may be resolved and stability may be ensured, which are advantageous in terms of processability of slurry.

Further, when the positive electrode slurry is prepared according to the present invention, the slurry viscosity may be more effectively controlled by additionally controlling the addition method, addition time, and addition temperature of oxalic acid, etc., and therefore, more improved stability of the slurry may be ensured.

Furthermore, when a positive electrode for a secondary battery is manufactured using the positive electrode slurry, agglomeration of active materials may be prevented during application of the slurry.

The invention claimed is:

1. A positive electrode slurry for preparing a positive electrode for a lithium secondary battery,
   the positive electrode slurry comprising a positive electrode active material, a conductive material, a binder, an overcharge inhibitor, oxalic acid, and a solvent,
   wherein the overcharge inhibitor is included in an amount of 1 part by weight to 2 parts by weight, based on 100 parts by weight of a total solid content of the positive electrode active material, the conductive material, and the binder,
   wherein the oxalic acid is included in an amount of 0.15 part by weight to 0.5 parts by weight, based on 100 parts by weight of the total solid content of the positive electrode active material, the conductive material, and the binder,
   wherein the positive electrode active material includes one or more lithium nickel-based oxides represented by the following Chemical Formula 1:

$Lia(Ni_xMn_yCo_zA_w)O_{2-b}X_b$ [Chemical Formula 1]

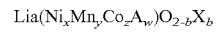

in Chemical Formula 1,
   A is one or more elements selected from the group consisting of W, V, Cr, Nb, Mo, Fe, and Al, X is one or more elements selected from the group consisting of P, N, F, S and Cl, 0.95≤a≤1.2, 0≤b≤0.02, 0.8≤x<1, 0<y<0.2, 0<z<0.2, 0≤w<0.2, and x+y+z+w=1, and
   wherein the overcharge inhibitor consists of $Li_2CO_3$.

2. The positive electrode slurry of claim 1, wherein the positive electrode slurry is at a temperature of 45° C. to 70° C. immediately after mixing.

3. The positive electrode slurry of claim 1, wherein an amount of the conductive material is 1% by weight to 30% by weight based on the total solid content of the positive electrode active material, the conductive material and the binder.

4. The positive electrode slurry of claim 1, wherein the conductive material includes at least one selected from the group consisting of graphite, carbon black, acetylene black, Ketjen black, channel black, lamp black, thermal black, conductive fibers, metallic powders, conductive whiskers and polyphenylene.

5. The positive electrode slurry of claim 1, wherein an amount of the binder is 1% by weight to 30% by weight based on the total solid content of the positive electrode active material.

6. The positive electrode slurry of claim 1, wherein the binder includes at least one selected from the group consisting of polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymers (EPDM), sulfonated EPDM, styrene butadiene rubber, and fluororubber.

7. The positive electrode slurry of claim 1, wherein the positive electrode slurry has a viscosity of 5190 cp to 15000 cp at room temperature.

8. A method of preparing a positive electrode slurry, the method comprising:
(a) a process of adding a positive electrode active material, a conductive material, and a binder to a solvent and then mixing with each other to prepare a mixture; and
(b) a process of adding oxalic acid and an overcharge inhibitor to the mixture and then mixing with each other to prepare the positive electrode slurry;
wherein the overcharge inhibitor is added in an amount of 1 part by weight to 2 parts by weight, based on 100 parts by weight of a total solid content of the positive electrode active material, the conductive material, and the binder,
wherein the oxalic acid is added in an amount of 0.15 part by weight to 0.5 parts by weight, based on 100 parts by weight of the total solid content of the positive electrode active material, the conductive material, and the binder, and
wherein the positive electrode active material includes one or more lithium nickel-based oxides represented by the following Chemical Formula 1:

$Li_a(Ni_xMn_yCo_zA_w)O_{2-b}X_b$ [Chemical Formula 1]

in Chemical Formula 1,
A is one or more elements selected from the group consisting of W, V, Cr, Nb, Mo, Fe, and Al, X is one or more elements selected from the group consisting of P, N, F, S and Cl, $0.95 \le a \le 1.2$, $0 \le b \le 0.02$, $0.8 \le x < 1$, $0 < y < 0.2$, $0 < z < 0.2$, $0 \le w < 0.2$, and $x+y+z+w=1$, and
wherein the overcharge inhibitor consists of $Li_2CO_3$.

9. The method of preparing a positive electrode slurry of claim 8, wherein the oxalic acid is added as an oxalic acid solution in which the oxalic acid is dissolved.

10. The method of preparing a positive electrode slurry of claim 9, wherein a concentration of the oxalic acid in the oxalic acid solution is 10% to 20%.

11. The method of preparing a positive electrode slurry of claim 8, wherein the process (b) is carried out when the mixture of the process (a) is at a temperature of 45° C. to 70° C.

12. The method of preparing a positive electrode slurry of claim 8, wherein, in the process (b), the oxalic acid is first added, and the overcharge inhibitor is later added.

13. The method of preparing a positive electrode slurry of claim 12, wherein the overcharge inhibitor is added within 5 minutes after adding the oxalic acid.

14. The method of preparing a positive electrode slurry of claim 8, wherein the positive electrode slurry after the process (b) has a viscosity of 4000 cp to 15000 cp at room temperature.

15. The method of preparing a positive electrode slurry of claim 8, wherein the positive electrode slurry after the process (b) has a viscosity of 5190 cp to 15000 cp at room temperature.

* * * * *